United States Patent [19]

Andersen

[11] 4,222,150
[45] Sep. 16, 1980

[54] SAUSAGE PEELING APPARATUS

[76] Inventor: Erik Andersen, No. 3 Axel Juels Alle, 2750 Ballerup, Denmark

[21] Appl. No.: 26,554

[22] Filed: Apr. 3, 1979

[30] Foreign Application Priority Data

Apr. 10, 1978 [DK] Denmark ............................. 1576/78

[51] Int. Cl.³ ...................... A22C 11/00; A22C 13/00
[52] U.S. Cl. .......................................... 17/1 F; 17/49
[58] Field of Search ....................... 17/1 F, 48, 49, 34

[56] References Cited

U.S. PATENT DOCUMENTS

| 2,672,646 | 3/1954 | Demarest et al. | 17/1 F |
| 2,725,591 | 12/1955 | Cline et al. | 17/1 F |
| 3,487,499 | 1/1970 | Klyce | 17/1 F |
| 3,583,023 | 6/1971 | Von Lersner et al. | 17/1 F |

FOREIGN PATENT DOCUMENTS

| 1507951 | 5/1970 | Fed. Rep. of Germany | 17/1 F |
| 745975 | 3/1936 | United Kingdom | 17/1 F |
| 848801 | 9/1960 | United Kingdom | 17/1 F |
| 1209104 | 10/1970 | United Kingdom | 17/1 F |

Primary Examiner—Willie G. Abercrombie
Attorney, Agent, or Firm—Lane, Aitken, Ziems, Kice & Kananen

[57] ABSTRACT

Apparatus for peeling sausages comprises means for feeding a chain of sausages in the longitudinal direction of the chain towards a pair of counterrotating rollers defining between them a roller nip located in the plane of symmetry between the rollers. The feeding means causes the leading end of each sausage in succession to meet the roller surfaces on either side of the plane of symmetry and at an obtuse angle to the longitudinal direction of the nip. Before each sausage meets the roller surfaces its casing has been slit by a knife, and due to their rotation the rollers grasp the slitted casing and pull it through the nip for removal separate from the skinned sausages which move along the rollers on the infeed side thereof until they are discharged at the end of the roller nip.

10 Claims, 8 Drawing Figures

SAUSAGE PEELING APPARATUS

BACKGROUND OF THE INVENTION

The present invention relates to an apparatus for removing the casing or skin from sausages, comprising feeding means for longitudinally advancing a continuous chain of sausages and a knife adapted to cut at least partially through the casing of each sausage in the chain in order to facilitate the removal thereof.

So-called skinless sausages or frankfurters are manufactured by filling meat or other stuffing into an artificial casing which forms a temporary skin during the processing of the stuffing and which is removed when the stuffing has obtained a sufficiently solid or coherent consistency. For removing the casing, which has been slit or at least scored by the knife, there are known peeling or skinning machines in which the sausage chain is advanced through an energetic jet of air which strips or flays the loosened casing from the sausages following which the casing is sucked away. The known machines emit a strong noise which is very annoying to the operator and which has made it necessary to place the machines separate from the remainder of the production equipment of the sausage factories, and this results in a less rational flow of the production operations with additional transport of the sausage chains and the peeled sausages to and from the peeling machines. An attempt to reduce the noise by means of sound attenuating shielding results in a reduced accessibility to the interior of the machine and thus prolongs the time necessary for remedying an interruption of the operation, such as when a sausage gets jammed in the machine.

SUMMARY OF THE INVENTION

According to the invention there is provided an apparatus for removing the casing from sausages, comprising feeding means for longitudinally advancing a continuous chain of sausages and a knife adapted to cut at least partially through the casing of each sausage in the chain in order to facilitate the removal thereof, wherein the improvement comprises a pair of rollers located downstream of said knife and defining between them an elongate roller nip located in a plane of symmetry between said rollers, means for rotating said rollers in opposite directions and such that in said roller nip the roller surfaces move away from that side of said nip where said feeding means is arranged, and said feeding means is shaped and arranged such as to direct the leading end of a sausage chain into contact with the roller surfaces along a path of movement located at least substantially in said plane of symmetry and including an obtuse angle with the longitudinal direction of said roller nip.

As used herein the term "roller nip" shall been construed as covering embodiments where the opposed roller surfaces are separated by a real gap during operation of the apparatus, as well as embodiments in which the roller surfaces are normally in contact over their entire length or a part thereof.

It has been found that an apparatus according to the invention can be operated at a rate which is comparable to the throughput rate of the known machines and with equal reliability, but with much less noise. The peeling of the sausages occurs solely as a result of the mechanical action of the rollers which by their rotation grasp the previously loosened casing, pull the casing from the sausages and carry it to the opposite side of the roller nip, from which it can be disposed of continuously or intermittently. Since neither pressurized air nor vacuum is employed for peeling the sausages, the noise level has been very substantially reduced so that a silencing shielding becomes superfluous. This ensures ready access to the interior of the apparatus for remedying interruptions of the operation and for cleaning the components of the apparatus. The apparatus can be located at a more expedient place in a production line which reduces the production costs. The operating costs of the production line are further reduced due to the fact that neither compressors nor vacuum pumps are required. Because the sausages are peeled at atmospheric pressure the casings can be collected in an open container which can readily be removed when it is full.

Preferably the obtuse angle included between the longitudinal direction of the roller nip and the path of movement of the sausage chain is between 130° and 145°. With an angle within this interval the force exerted on the sausage chain by the feeding means ensures that during the subsequent movement of the peeled sausages out of the apparatus they retain their contact with the roller surfaces so that they can be collected in an orderly manner downstream of the discharge ends of the rollers. If the angle is substantially larger than 145° it may be necessary to provide additional means for keeping the sausages in contact with the rollers, and with an angle substantially less than 130° there is the risk that not only the casing but also the peeled sausages may be pulled into the roller nip whereby their surfaces may be damaged.

At least the surface of one of the peeling rollers may be rugged in the region thereof wherein the leading end of a sausage contacts the roller surfaces. The rugged surface portion or portions of the rollers enhances the gripping force exerted by the surfaces on the loosened casing and thus ensures that the casing is pulled through the roller nip quickly after each sausage or link of the chain has obtained contact with the rollers. The rugged or rough roller surface also appears to permit the use of smaller diameter rollers which result in a larger dihedral angle included between the two planes each of which is the common tangent plane to one roller surface and a sausage in contact with the rollers. For ensuring a minimum of frictional resistance against the movement of the peeled sausages to the discharge ends of the rollers it is expedient that only a portion of the roller surfaces is rough or rugged while the remaining surface portions are smooth.

The apparatus may comprise spring means biasing the peeling rollers towards one another. This permits inter alia that if a foreign body is present, the rollers may yield and let the foreign body pass through the thus enlarged gap together with the casing. The embodiment makes it possible to maintain a desired contact pressure between the roller surfaces if they are to contact each other during normal operation, but it can also be combined with stop means, preferably adjustable, for determining a minimum gap width between the rollers.

The feeding means for advancing a sausage chain to the roller nip may comprise two rows of parallel rolls arranged above and below the path of movement of the sausage chain, respectively, and means for rotating the upper and lower rolls in opposite directions.

In order to permit adjustment of the feeding means to sausages of different thickness or diameter one row of feeding rolls may be displaceable as a unit towards and away from the other row of rolls.

Means may be provided for supporting the upper row of rolls for pivoting as a unit about an axis parallel to the axes of rotation of the rolls. This permits easy access to the interior of the feeding means, e.g. for cleaning purposes or for manually removing sausages, which may have got jammed.

All or some of the rolls may be hour-glass shaped whereby the feed rolls get an efficient hold on the sausages.

The feeding means may further comprise two pairs of endless round belts tracked over the upper and lower rolls, respectively, for engagement with a sausage chain symmetrically with respect to its path of movement. This embodiment is especially advantageous for processing short sausages, such as cocktail frankfurters, because frictional contact can be maintained between the belts and the sausage chain along the entire operative length of the belts, even with a relatively large spacing of the rolls in the feeding or advancing direction.

For ensuring that the casing does not stick to the rollers after being pulled from the sausages, the apparatus may comprise nozzles for emitting atomized liquid jets towards the surfaces of the peeling rollers and in directions opposed to the direction of rotation of the respective roller.

BRIEF DESCRIPTION OF THE DRAWINGS

The invention will now be described in more detail with reference to the accompanying schematical drawings, in which.

DETAILED DESCRIPTION

Figure 1:
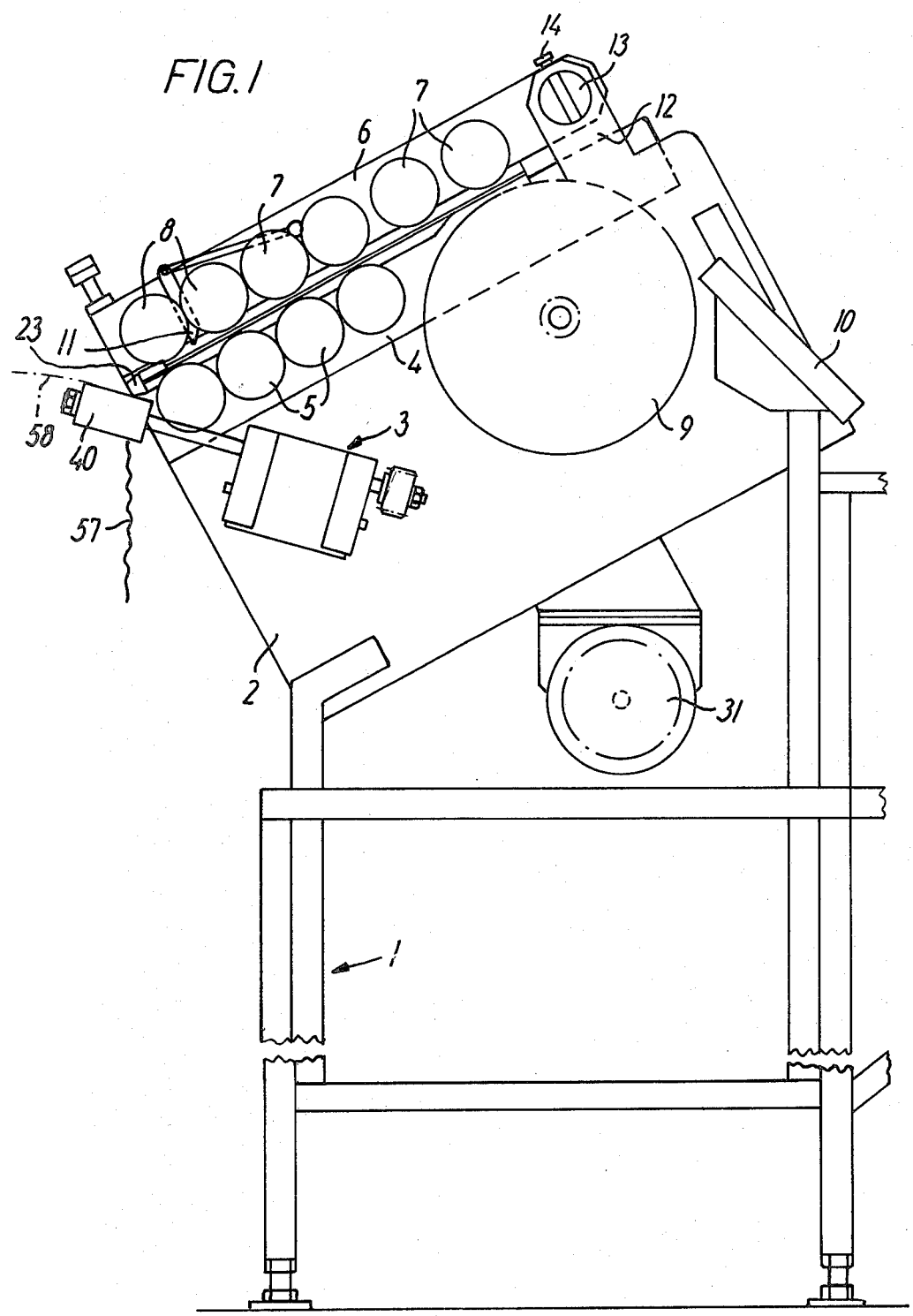
FIG. 1 is an elevation of an apparatus embodying the invention.

As shown the apparatus comprises a frame 1 to which there is secured a vertical mounting plate 2 which carries those components which are employed for skinning or peeling the sausages. These components include a peeling roller unit 3, a lower bearing block 4 supporting a row of lower feed rolls 5, an upper bearing block 6 supporting a row of upper feed rolls 7 and 8, a rotatable infeed wheel 9, a stationary infeed ramp 10 and a knife 11 for slitting or scoring the casing of a sausage chain before removal of the casing.

Figure 3:
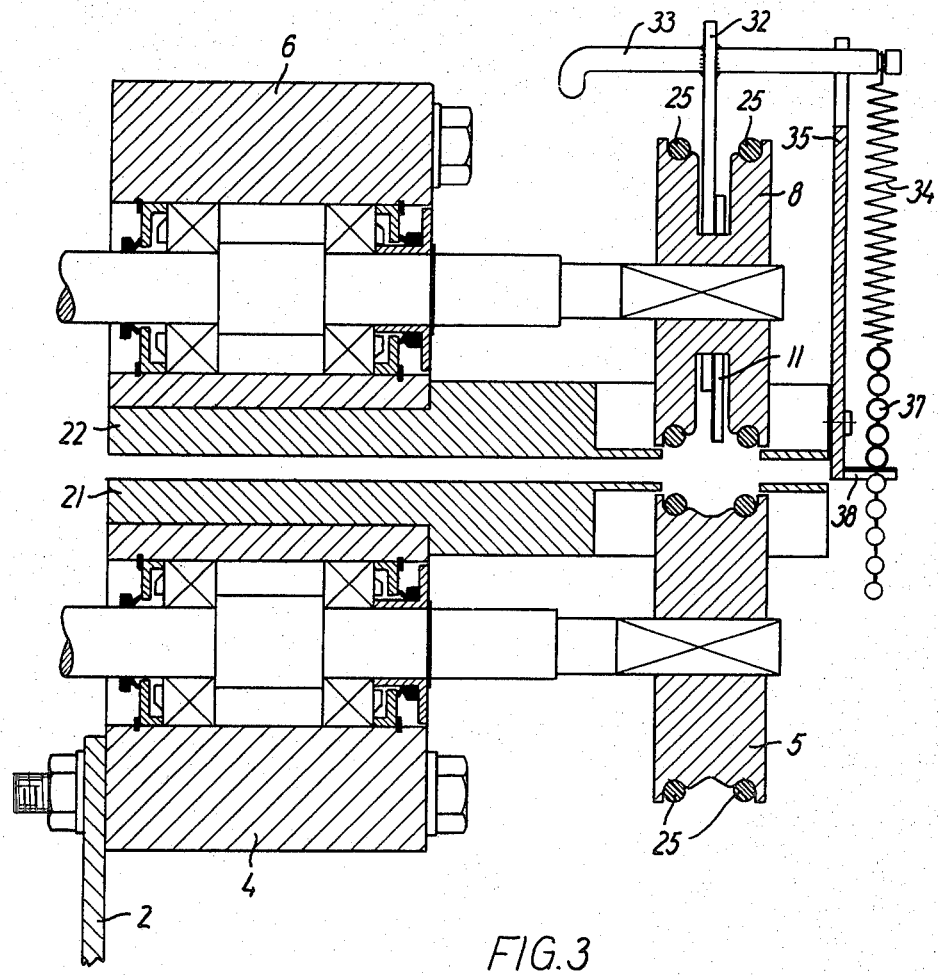

Lower bearing block 4 is bolted to plate 2, see FIG. 3, which also shows how rolls 5 are journalled in the block. At its rear end upper bearing block 6 is pivotally supported between two parallel arms 12 secured to bearing block 4. Block 6 pivots on a support pin 13 which is received in eccentric bores in arms 12 so that rotation of pin 13 changes the spacing between the rear ends of blocks 4 and 6. Pin 13 is locked in a adjusted angular position by means of a screw 14.

Figure 2:
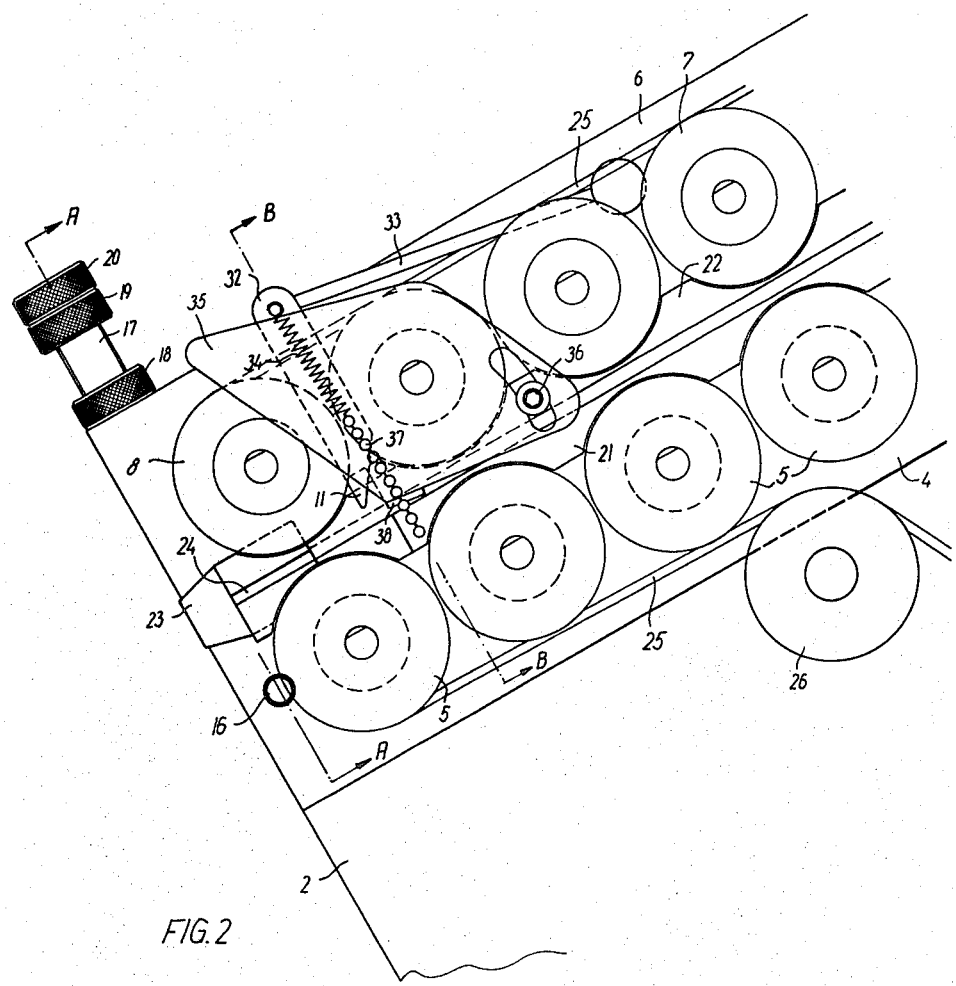
FIG. 2 is a fractional view on a larger scale showing the outlet end of the sausage feeding unit of the apparatus.
Figure 2A:
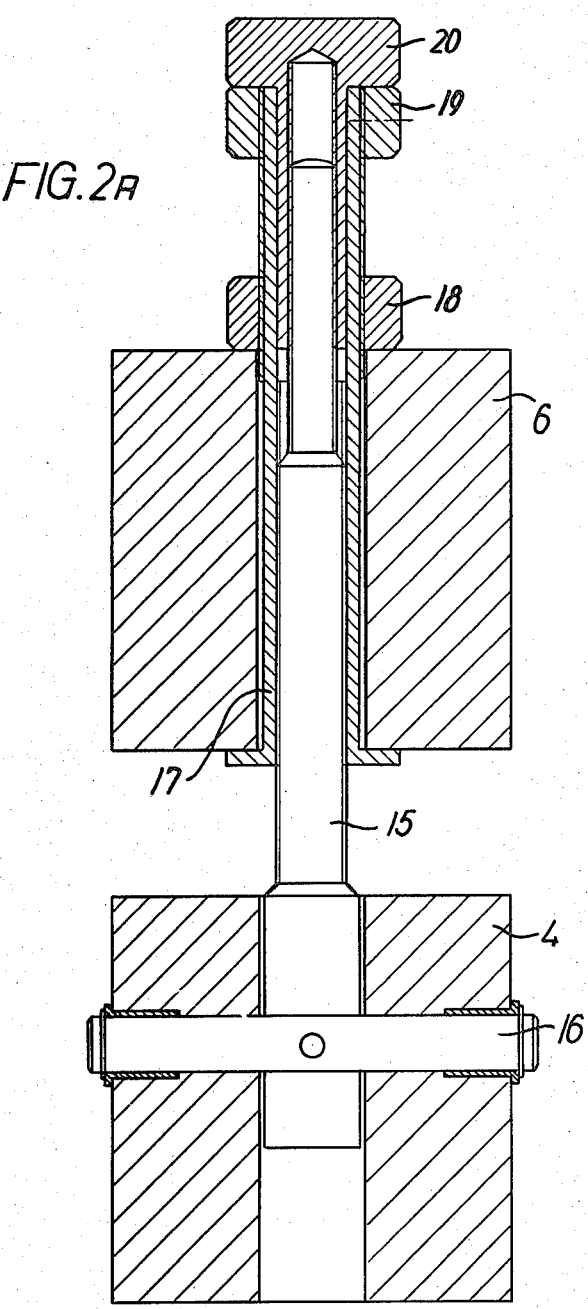
FIGS. 2A and 3 are sections along lines A—A and B—B of FIG. 2.

The front end of bearing block 6 is displaceable parallel to bearing block 4 towards and away therefrom by means of the arrangement shown at the left of FIG. 2. The ends of both bearing blocks are slit for receiving a threaded bolt 15 which can pivot about a transverse stud 16 secured in block 4. A threaded sleeve 17 is formed, at its lower end, with a collar capable of engaging the underside of block 6 and the sleeve may be clamped to block 6 by means of a lock nut 18 threaded on the exterior thread of the sleeve. Sleeve 17 also has an internal thread engaging the thread of bolt 15 so that rotating the sleeve causes it to be displaced up and down along the bolt. For rotating sleeve 17 a ring 19 is secured to the upper end of the sleeve. When the desired spacing between bearing blocks 4 and 6 has been adjusted by rotation of sleeve 17, the sleeve is locked to bolt 15 by means of a lock nut 20 engaging with a thread on the upper, reduced end of bolt 15. It will be understood that after loosening of lock nut 18 bolt 15 can be pivoted counterclockwise about stud 16, until it is clear of upper bearing block 6 which then can be pivoted clockwise on support pin 13 to provide access to the space between the bearing blocks.

A row of six feed rolls are journalled behind one another in upper bearing block 6 with their axes of rotation parallel to the axes of lower feed rolls 5. The four rolls 7 at the rear or infeed end are identical with rolls 5 while the two rolls 8 at the front or outlet end are slightly different, see FIG. 3, in order to provide clearance for knife 11 located between these rolls.

A lower guide bar 21 is secured to the upper side of bearing block 4, and an upper guide bar 22 is secured to the underside of bearing block 6. The guide bars extend laterally beyond feed rolls 5, 7, and 8 as shown in FIG. 3. A nozzle 23 for guiding a sausage chain from the feed rolls onto the peeling rollers is detachably secured to the front end of guide bar 21 by means of lugs 24 integral with the nozzle.

The axis of nozzle 23, which determines the path of movement of the sausage chain immediately before a link or sausage of the chain contacts peeling roller unit 3, coincides with the path along which the chain moves between feed rolls 5, 7, and 8 or in other words with the line of intersection between a vertical plane located midway of the operative width of the feed rolls and a plane parallel to the axes of the rolls and equispaced from the upper and lower axes.

While in principle the sausage chain could be advanced and guided from infeed wheel 9 to nozzle 23 solely by means of the feed rolls 5, 7, and 8, in particular when rolls 5 and 7 have hour-glass shaped profiles as shown in FIG. 3, it may be advantageous to employ the four endless round belts 25, as shown, for frictionally engaging with and feeding the sausage chain. The two upper belts 25 are tracked over all six upper rolls 7 and 8, while the two lower belts are tracked over the four rolls 5 on that side which faces the path of movement of a sausage chain between bars 21 and 22. On the lower side of bearing block 4 these lower belts are tracked over a tensioning pulley 26, see FIG. 7, and over a drive pulley secured to the shaft of infeed wheel 9.

Figure 7:
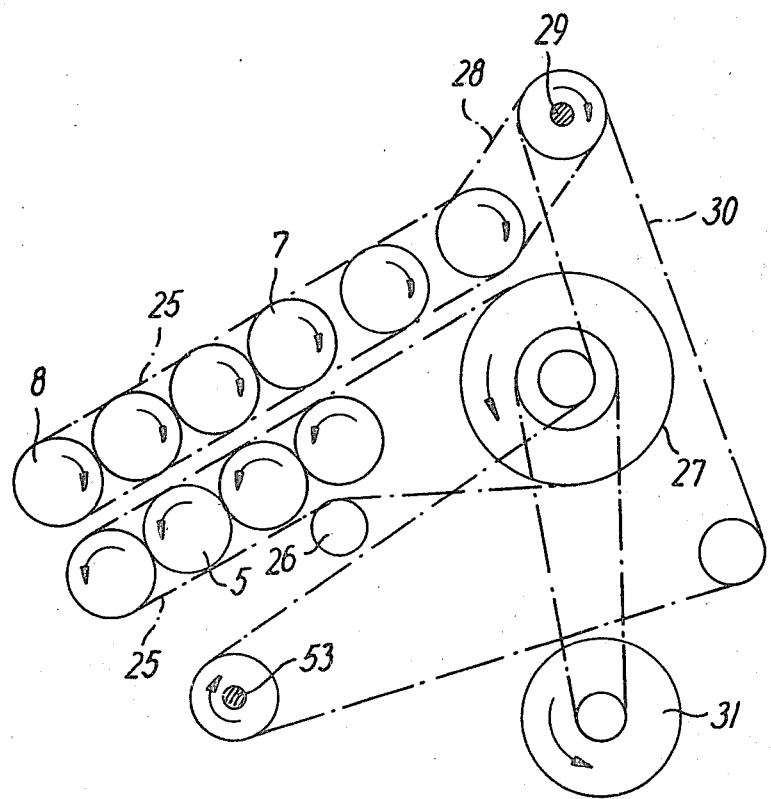
FIG. 7 is a schematic view of the drive mechanisms of the apparatus.

As shown in FIG. 7 the two upper belts 25 may be driven from a drive belt 28 tracked over a pulley on a shaft of the rearmost roll 7 and over a pulley secured to a shaft 29 journalled in support pin 13. Shaft 29 is driven from the shaft of wheel 9 through a belt 30 which also drives the peeling roller unit 3 to be described below. The shaft of wheel 9 is driven from a drive motor 31 which is also shown in FIG. 1.

Knife 11, which is located between the two foremost feed rolls 8 in the vertical plane of symmetry between belts 25 and thus in the same vertical plane as the axis of nozzle 23, is detachably secured to a support plate 32, which in turn is secured to an angled arm 33. The rear end of arm 33 is pivotally supported by upper bearing block 6. One end of a tension spring 34 is hooked onto the opposite end of arm 33 so as to bias the arm and hence knife 11 downwardly toward a stop formed by the upper edge of a plate 35. Plate 35 is pivotally connected to guide bar 22 and can be clamped to the bar by means of a bolt 36 extending through an arcuate slot in the plate. Rotation of plate 35 changes the location of the upper plate edge against which arm 33 may abut whereby the maximum cutting depth of knife 11 is determined. The force exerted on arm 33 by spring 34 may be adjusted by shifting the point of engagement between a ball chain 37 secured to the lower end of spring 34 and a slit through a finger 38 projecting from plate 35.

Peeling unit 3 comprises two rollers 39 and 40 each secured to one of two parallel shafts 41 and 42. Shaft 42 is journalled in a bearing block 43 secured to mounting plate 2. Shaft 41 is journalled in a bearing block 44 which by means of two pivot pins 45 parallel to shafts 41 and 42 is mounted between two side plates 46 secured to the fixed bearing block 43. Bearing block 44 is spring loaded towards bearing block 43 by means of two compression springs 47 each operative between block 44 and a shoulder on a screw 48 which is adjustably received in an arm 49 projecting upwardly from a side plate 46. The movement of bearing block 44 towards block 43 is limited by two adjustable stop screws 50, each threaded into one of the arms 49 below the pivot axis defined by pins 45.

In the normal position of the peeling rollers, i.e. when bearing block 44 abuts stop screws 50, the vertical plane of symmetry between the rollers coincides with the previously mentioned vertical plane containing the path of movement of a sausage chain leaving the feed means, as defined by the axis of guide nozzle 23. In the embodiment illustrated on the drawings the nip between the rollers includes an angle of approximately 137° with the axis of the guide nozzle.

Figure 4:
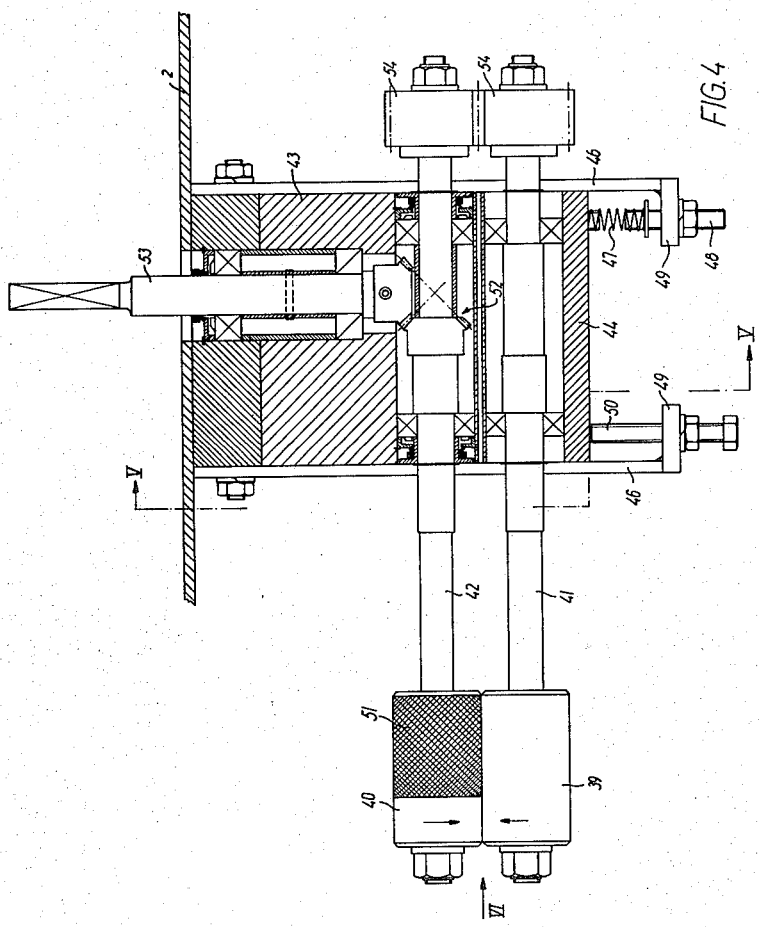
FIG. 4 is a longitudinal section through the roller unit of the apparatus.
Figure 5:
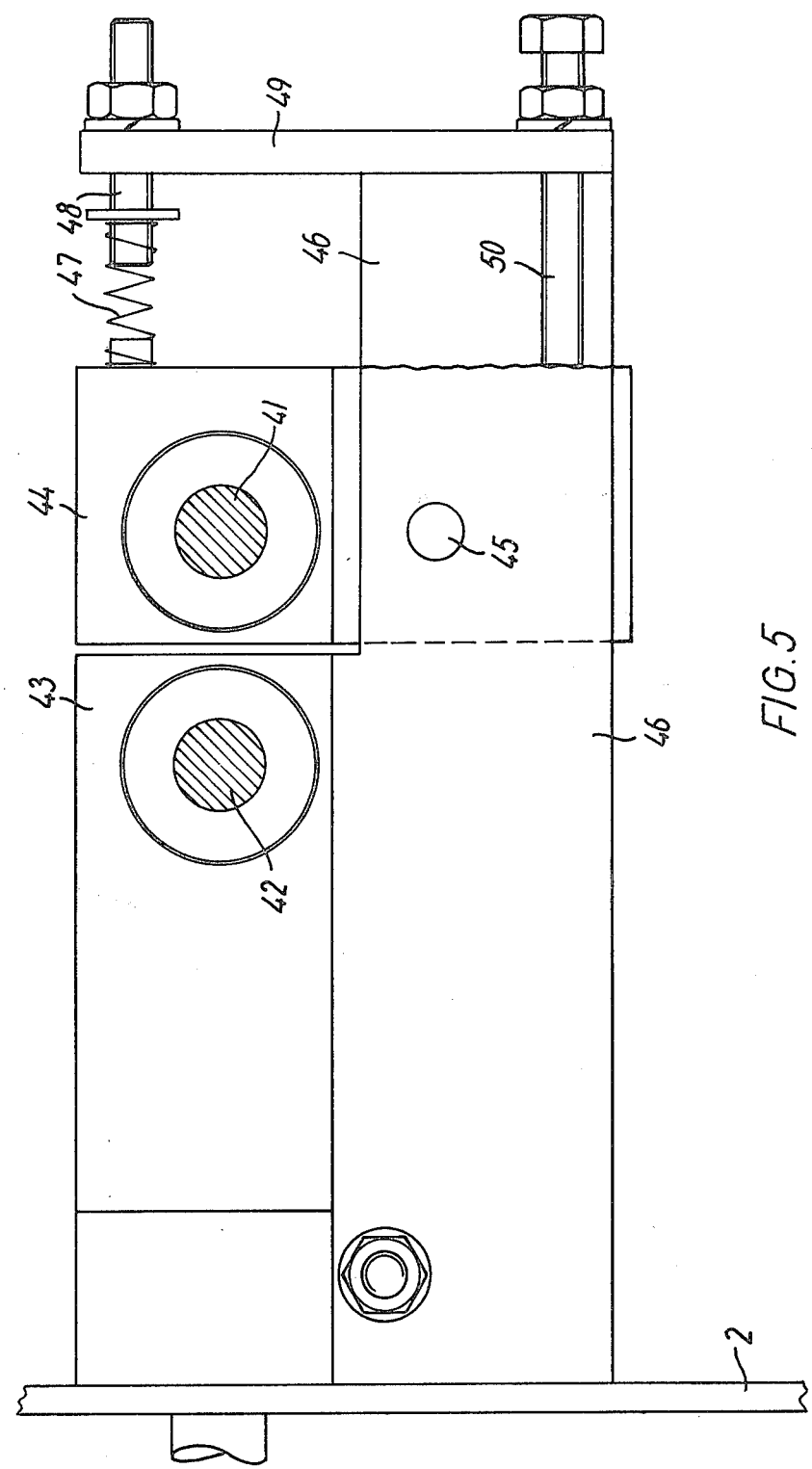
FIG. 5 is a section along line V—V of FIG. 4.

As shown in FIG. 4 one roller 40 may comprise a knurled or fluted section 51 located immediately below nozzle 23 whereas the remaining length of roller 40 and the entire roller 39 may have smooth surfaces.

Through a conical gear 52 shaft 42 is driven from a transverse shaft 53 journalled in bearing block 43 and carrying behind mounting plate 2 a pulley (not shown) over which belt 30, see FIG. 7, is tracked. Shaft 41 is driven from shaft 42 in synchronism with that shaft and in the opposite direction of rotation through two cylindrical gear wheels 54 secured to the shaft ends remote from the rollers.

Figure 6:
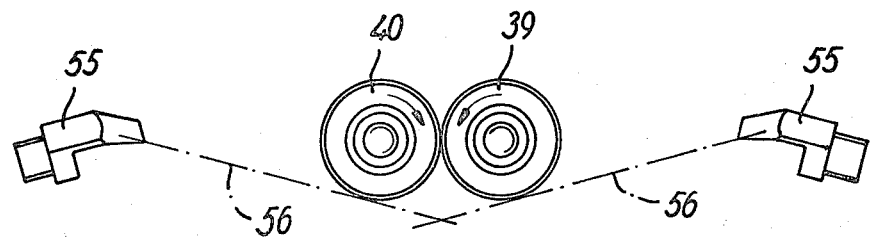
FIG. 6 is an end view of the rollers with associated liquid nozzles seen in the direction of arrow VI in FIG. 4.

As shown in FIG. 6 one or if desired more nozzles 55 may be arranged at a lateral spacing from each roller 39 and 40. The nozzles may, in a manner not shown, be mounted, preferably adjustably, on the mounting plate 2 or on frame 1, and each nozzle emits a flat, fan-shaped liquid jet 56 which grazes the lower surface part of the associated roller and which is opposed to the direction of rotation of the roller surface.

During operation of the apparatus motor 31 causes the rotatable components described above to rotate in the directions indicated by arrows in FIGS. 4, 6, and 7. A sausage chain is manually fed along ramp 10 and infeed wheel 9 to the gap between the wheel and the rearmost feed roll 7. The sausage chain may be taken from a water-filled vat (not shown in FIG. 1) placed on frame 1 to the right of ramp 10. Each sausage chain, the length of which may be about 60 feet, is advanced until its leading sausage or link is gripped between wheel 9 and the counterrotating roll 7 or the two belts 25 tracked over roll 7, as the case may be. As the sausages arrive in succession to knife 11, their casing or skin is slit by the knife, and as the sausages continue through guide nozzle 23, the surfaces of the counterrotating rollers 39 and 40 catch the casing and pull it down through the roller nip as indicated by a wavy line 57 in FIG. 1. The detached casing can be collected in a receptacle (not shown) placed below the rollers. The individual sausages, whose mutual connection in the chain has been broken by the slitting and pulling-off of the casing, move forward on the upwardly facing roller surfaces along a path, which in FIG. 1 is indicated by a dot-and-dash line 58, and they can be collected in a different receptacle (not shown).

Stop screws 50 can be adjusted so as to bring rollers 39 and 40 in direct mutual contact under the influence of springs 47 or to define a minimum width of a positive gap between the rollers, which gap may be about 0.1 mm wide dependent on the thickness of the casing to be removed.

The liquid jet nozzles 55 may, if desired, be replaced by two stationary scrapers engaging the roller surfaces so as to ensure that the casing does not stick to the rollers. Such scrapers may be combined with nozzles emitting liquid or gas jets towards the roller surfaces. The increased friction of section 51 of roller 40 may be obtained by grinding or turning that section to a higher surface roughness than the remainder of the rollers. A rough roller surface could also be obtained by casting rollers or roller sections from rubber or similar material.

The apparatus may be equipped with a nozzle through which steam can blown against the sausages when they are fed into the apparatus. The steam heats the sausages and reduces the cohesion between their stuffing and casing which may facilitate the subsequent peeling or skinning of the sausages.

I claim:

1. Apparatus for removing the casing from sausages, comprising feeding means for longitudinally advancing a continuous chain of sausages and a knife adapted to cut at least partially through the casing of each sausage in the chain in order to facilitate the removal thereof, wherein the improvement comprises a pair of rollers located downstream of said knife and defining between them an elongate roller nip located in a plane of symmetry between said rollers, means for rotating said rollers in opposite directions and such that in said roller nip the roller surfaces move away from that side of said nip where said feeding means is arranged, and said feeding means is shaped and arranged such as to direct the leading end of a sausage chain into contact with the roller surfaces along a path of movement located at least substantially in said plane of symmetry and including an obtuse angle with the longitudinal direction of said roller nip.

2. Apparatus as claimed in claim 1, wherein said obtuse angle included between the longitudinal direction of the roller nip and the path of movement of the sausage chain is between 130° and 145°.

3. Apparatus as claimed in claim 1, wherein at least the surface of one of said rollers is rugged in the region thereof, wherein the leading end of a sausage contacts the roller surfaces.

4. Apparatus as claimed in claim 1, further comprising spring means biasing said roller towards one another.

5. Apparatus as claimed in claim 1, wherein said feeding means for advancing a sausage chain to said roller nip comprises two rows of parallel rolls arranged above and below said path of movement, respectively, and means for rotating the upper and lower rolls in opposite directions.

6. Apparatus as claimed in claim 5, wherein one row of rolls is displaceable as a unit towards and away from the other row of rolls.

7. Apparatus as claimed in claim 5, comprising means supporting the upper row of rolls for pivoting as a unit about an axis parallel to the axes of rotation of the rolls.

8. Apparatus as claimed in claim 5, wherein at least some of said rolls are hour-glass shaped.

9. Apparatus as claimed in claim 5, wherein said feeding means further comprises two pairs of endless round belts tracked over the upper and lower rolls, respectively, for engagement with a sausage chain symmetrically with respect to said path for movement.

10. Apparatus as claimed in claim 1, further comprising nozzles for emitting atomized liquid jets towards the surfaces of said rollers and in directions opposed to the direction of rotation of the respective roller.

* * * * *